(12) United States Patent
Thompson (10) Patent No.: US 11,687,501 B2
(45) Date of Patent: Jun. 27, 2023

(54) INFORMED DATA RETRIEVAL

(71) Applicant: Nathan Christopher Thompson, Boulder, CO (US)

(72) Inventor: Nathan Christopher Thompson, Boulder, CO (US)

(73) Assignee: Spectra Logic Corporation, Boulder, CO (US)

(*) Notice: Subject to any disclaimer, the term of this patent is extended or adjusted under 35 U.S.C. 154(b) by 1237 days.

(21) Appl. No.: 15/622,045

(22) Filed: Jun. 13, 2017

(65) Prior Publication Data

US 2018/0357257 A1    Dec. 13, 2018
US 2021/0117511 A9    Apr. 22, 2021

Related U.S. Application Data

(60) Provisional application No. 62/354,468, filed on Jun. 24, 2016.

(51) Int. Cl.
*G06F 16/185* (2019.01)
*G06F 16/11* (2019.01)
*G06F 3/06* (2006.01)

(52) U.S. Cl.
CPC ............ *G06F 16/185* (2019.01); *G06F 3/061* (2013.01); *G06F 3/0604* (2013.01); *G06F 3/0647* (2013.01); *G06F 3/0649* (2013.01); *G06F 3/0665* (2013.01); *G06F 3/0685* (2013.01); *G06F 16/113* (2019.01); *G06F 16/122* (2019.01); *G06F 3/0686* (2013.01)

(58) Field of Classification Search
CPC ...... G06F 16/185; G06F 3/061; G06F 3/0665; G06F 3/0649; G06F 16/122; G06F 16/113; G06F 3/0647; G06F 3/0685; G06F 3/0604; G06F 3/0686; H04L 12/66; H04L 41/22; H04L 45/00; H04L 43/045; H04L 45/70; H04L 43/10; H04L 45/02; H04L 45/16; H04L 45/26
See application file for complete search history.

(56) References Cited

U.S. PATENT DOCUMENTS

| | | | |
|---|---|---|---|
| 5,369,532 A * | 11/1994 | Dodt | G06F 3/0601 |
| | | | 360/48 |
| 6,038,588 A | 3/2000 | Nagarajayya et al. | |
| 6,105,021 A | 8/2000 | Berstis | |
| 6,208,995 B1 | 3/2001 | Himmel et al. | |

(Continued)

*Primary Examiner* — Mariela Reyes
*Assistant Examiner* — Fatima P Mina
(74) *Attorney, Agent, or Firm* — Kenneth Altshuler (57) ABSTRACT

A tiered storage arrangement is contemplated that provides high speed tier 1 storage for rapid access to recalled data, mid-speed tier 2 storage for data that is not frequently recalled and tier 3 storage for archive purposes that may include tape library storage and even cold storage in vaults. Embodiments contemplate a server linked to all tiered storage devices on one end and a host computer on another. Data files can be migrated between the tiered storage systems based on migration policies, such as time elapsed from being filed or last accessed. Also, embodiments contemplate a time bar displayed at the host computer that provides accurate time predictions of data recall including information of the kind of storage on which a target file is stored and the pathway to recall the target file/s locally to the host computer.

24 Claims, 10 Drawing Sheets

(56) References Cited

U.S. PATENT DOCUMENTS

| | | |
|---|---|---|
| 6,275,987 B1 | 8/2001 | Fraley et al. |
| 6,505,237 B2 | 1/2003 | Beyda et al. |
| 6,874,130 B1* | 3/2005 | Baweja ............... G06F 16/10 |
| | | 715/805 |
| 7,043,548 B2 | 5/2006 | Bouet |
| 7,188,146 B1 | 3/2007 | Tsukada |
| 7,246,101 B2 | 7/2007 | Fu et al. |
| 7,343,566 B1 | 3/2008 | Chaudhri et al. |
| 7,440,965 B1* | 10/2008 | Pruthi ................. G06F 11/1448 |
| 7,475,358 B2 | 1/2009 | Anzelde et al. |
| 7,924,730 B1* | 4/2011 | McAllister ............. H04L 43/10 |
| | | 709/236 |
| 8,019,885 B2 | 9/2011 | Yu et al. |
| 8,549,138 B2 | 10/2013 | Bar-Caspi et al. |
| 8,661,431 B2 | 2/2014 | Barthel et al. |
| 9,426,046 B2 | 8/2016 | Ivershen |
| 9,867,141 B2 | 1/2018 | Chen |
| 10,116,709 B1* | 10/2018 | Kielhofner ......... H04L 65/1053 |
| 10,176,212 B1* | 1/2019 | Prohofsky ............ G06F 3/0605 |
| 2001/0005846 A1* | 6/2001 | Barney ................. G06F 16/10 |
| 2001/0055017 A1 | 12/2001 | Ording |
| 2004/0046790 A1 | 3/2004 | Agarwal et al. |
| 2005/0081007 A1* | 4/2005 | Gold ................. G06F 11/1448 |
| | | 711/162 |
| 2005/0183017 A1 | 8/2005 | Cain |
| 2006/0074520 A1* | 4/2006 | Trimmer ................ G11B 15/68 |
| | | 700/214 |
| 2009/0003232 A1* | 1/2009 | Vaswani ................. H04L 45/00 |
| | | 370/252 |
| 2009/0043598 A1* | 2/2009 | Mayer .................... G06Q 10/00 |
| | | 705/1.1 |
| 2009/0046587 A1* | 2/2009 | Kothari ................. H04L 45/12 |
| | | 370/238 |
| 2010/0061702 A1* | 3/2010 | Tanaka ................. G11B 27/329 |
| | | 386/241 |
| 2010/0107078 A1 | 4/2010 | Hayashi |
| 2011/0078112 A1* | 3/2011 | Takata ................ G06F 16/1748 |
| | | 707/622 |
| 2011/0157742 A1* | 6/2011 | Thompson ......... G11B 15/6835 |
| 2011/0216444 A1* | 9/2011 | Brume ..................... G11B 5/78 |
| | | 360/134 |
| 2011/0258379 A1* | 10/2011 | Hayashi ................ G06F 3/0683 |
| | | 711/114 |
| 2012/0079323 A1* | 3/2012 | Chincisan ........... G06F 16/1858 |
| | | 714/E11.131 |
| 2012/0179779 A1 | 7/2012 | Awasthi |
| 2013/0144839 A1* | 6/2013 | Evans ................. G06F 11/1458 |
| | | 707/640 |
| 2013/0311832 A1* | 11/2013 | Lad ......................... H04L 43/08 |
| | | 714/37 |
| 2013/0339598 A1* | 12/2013 | Wideman ............. G06F 3/0659 |
| | | 711/111 |
| 2014/0321315 A1* | 10/2014 | Akhter .................... H04L 43/10 |
| | | 370/253 |
| 2016/0011964 A1* | 1/2016 | Rostoker ............. G06F 12/0215 |
| | | 711/103 |
| 2017/0070574 A1* | 3/2017 | Sawada ............... H04L 67/1097 |

\* cited by examiner

INFORMED DATA RETRIEVAL

CROSS-REFERENCE TO RELATED APPLICATIONS

This application is a non-provisional application which claims priority to and the benefit of U.S. Provisional Patent Application Ser. No. 62/354,468, entitled Informed Data Retrieval filed Jun. 24, 2016, the entire disclosure of which is hereby incorporated by reference.

FIELD OF THE INVENTION

The present embodiments are directed to a tiered storage arrangement and to displaying data recall information including time to recall data that resides in the tiered storage arrangement or other storage arrangement.

DESCRIPTION OF RELATED ART

Presently, when a local device recalls data from an off-site location the local device will sometimes show an animation of a bar slowly filling up to indicate approximately how long the data will take to be accessible on the local device. Often, the bar will fill up fairly quickly, but then all of a sudden stalls near the end of the time bar and sits there while the data is recalled. Though time bars indicate recall activity, they are hardly predictive of actual time to recall.

It is to innovations related to this subject matter that the claimed invention is generally directed.

SUMMARY OF THE INVENTION

The present embodiments generally relate to a tiered storage arrangement and to displaying data recall information including time to recall data that resides in the tiered storage arrangement or other arrangement.

Certain embodiments contemplate a storage arrangement comprising: a server linked to a tier 3 storage system that comprises a plurality of tape cartridges, a tape library with on-site storage of at least some of the tape cartridges, a vault with off-site storage capability for storing at least some of the tape cartridges; a first target file retained in the tier 3 storage system; a host computer system that has access to the first target file via the server, the host computer devoid of knowledge that the first target file is retained in the tier 3 storage system prior to recalling the first target file; and after the host computer system seeks recall of the first target file, a display device at the host computer system displaying that the first target file is retained in the tier 3 storage system, either on-site or off-site, time to recover the first target file when recalled by the host computer system, and where the first target file is located while the first target file being recalled.

Yet other embodiments of the present invention can therefore comprise a method for providing a host computer connected to a server, the server linked to a tier 1 storage system and a tier 2 storage system, the tier 1 storage system possessing high-speed Random Access Media (RAM) storage devices, the tier 2 storage system comprises RAM storage devices that are slower than the high-speed RAM storage devices; requesting access to a second data file, the request originating by the host and targeted to the server; the server locating the second data file in the tier 2 storage system; transmitting a message to the host computer that the second data file is in the tier 2 storage system; and sending a prediction time it will take to recall the second data file to the host computer.

And, yet other embodiments of the present invention contemplate a storage arrangement comprising: a server linked to a tier 1 storage system and a tier 2 storage system, the tier 1 storage system comprises high-speed Random Access Media (RAM) storage devices, the tier 2 storage system comprises RAM storage devices that are slower than the high-speed RAM storage devices; a first target file retained in the tier 1 storage system and a second target file retained in the tier 2 storage system; a host computer system that has access to the first target file and the second target file via the server, the host computer devoid of knowledge of where the first target file and the second target file are retained prior to recalling either the first target file or the second target file; and a display device that displays both that the second target file is retained in the tier 2 storage system and how long the second target file will take to recover at the host computer system when recalled by the host computer system.

DETAILED DESCRIPTION

Initially, this disclosure is by way of example only, not by limitation. Thus, although the instrumentalities described herein are for the convenience of explanation, shown and described with respect to exemplary embodiments, it will be appreciated that the principles herein may be applied equally in other types of situations involving similar uses of tiered storage and recall messaging. In what follows, similar or identical structures may be identified using identical call-outs.

Certain embodiments described herein are directed to solving a problem where end-users are essentially in the dark to specific details and loading time for recalling and making local one or more off-site target files. More specifically, when a target file is retained in an off-site/non-local location, such as in "the cloud", an end user will have no idea on what kind of storage the target file resides and what it will take to recall that target file. The target file can exist on any variety of storage media including solid-state drives (SSDs), hard disk drives (HDDs), shingled magnetic recording (SMR) HDDs, optical disks, tape, etc. Obviously, the kind of storage device the target file is retained on will impact the time it takes to recall the target file. When an end user recalls a target file, there are some programs that will provide a time estimate to import the target file from off-site by providing a horizontal time bar (also called a loading bar) that fills up from left to right, the left side of the bar is when recall starts and the right side of the bar is when the target file is imported and made local. Unfortunately, time bars are very inaccurate and commonly start out fast and then just sit there moving very slowly, and sometimes not at all as they progress to the right. Certain time bars simply start over when the target program fails to load leaving an end user perplexed and without a sense of what is going on. Certain embodiments disclosed herein contemplate breaking the time bar into sections with messages that are near (close proximity to, next to, immediately above or below the time bar, to the immediate right or left of the time bar, etc.) or on the time bar indicating where the target file is coming from at any given moment during data recall.

Figure 1:
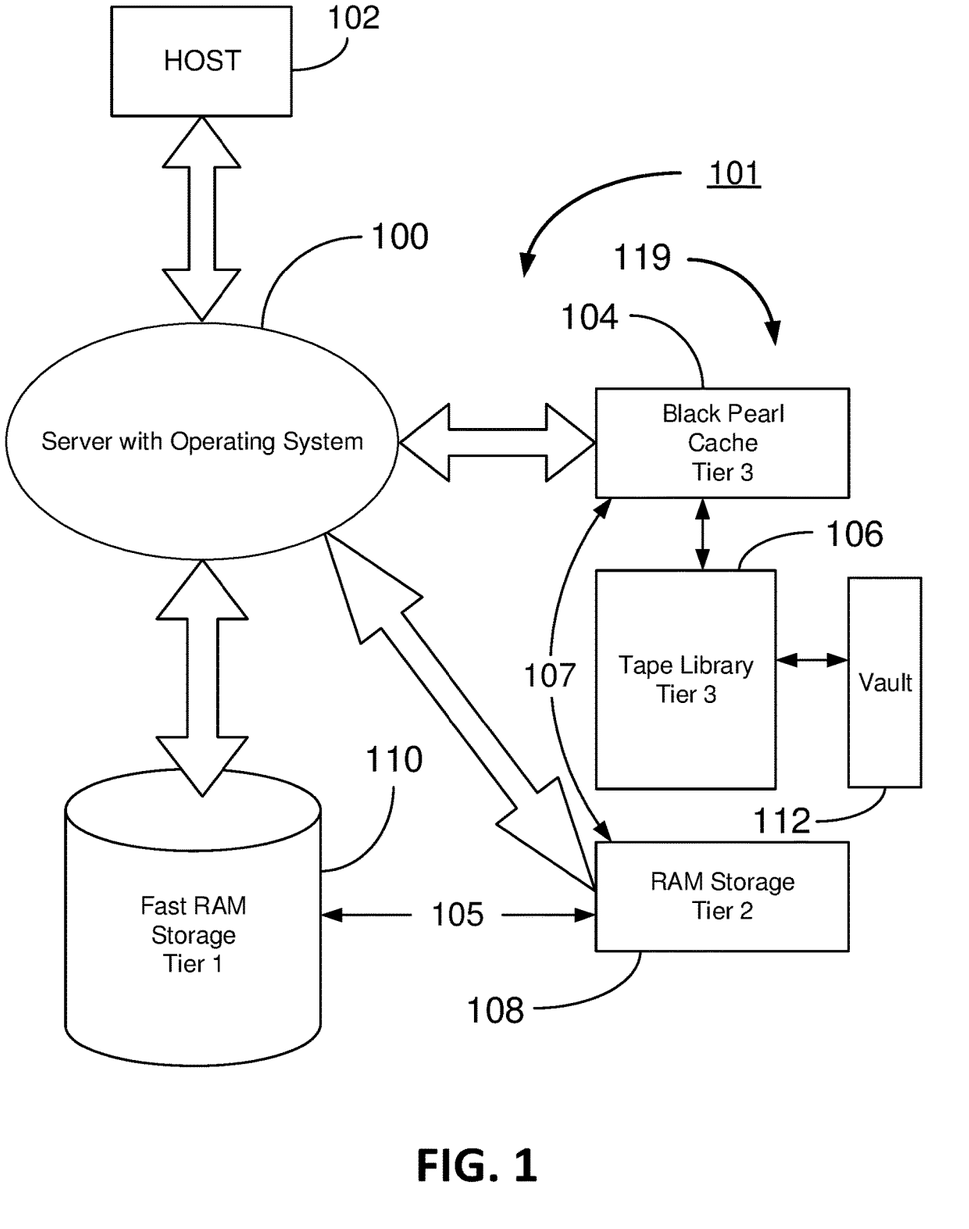
FIG. 1 depicts a block diagram of a storage system embodiment consistent with embodiments of the present invention.

FIG. 1 depicts a block diagram of a storage system embodiment consistent with embodiments of the present invention. The tiered storage arrangement 101 embodiment generally comprises tiered storage system and a server/operating system 100 that is a center point between a host computer system 102, tier 1 storage 110, tier 2 storage 108 and tier 3 storage 119. Tier 1 storage 110, in this embodiment, is a fast random access storage (RAM) system, such as enterprise HDDs, Solid State Drives (SSDs), or some other fast storage. Tier 1 storage tends to be comprised of the most expensive (per GB of data) storage device/s to retain data thereon compared with the other tiered storage systems. Because tier 1 storage 110 is expensive, certain embodiments contemplate setting up data migration policies that will move data to the tier 2 storage 108 based on importance to recall the data quickly. And, migrating data from the tier 2 storage 108 to tier 3 storage 119 for long-term storage can also be policy driven based on importance of a target data file. Examples of categorizing importance to recall data, such as a target file, can include a) the time that has elapsed since the target data file was last accessed, b) a tag placed on importance of the target data file by an end user, c) the frequency of use of the target data file, d) the time that has elapsed since storing the target data file, e) oldest file in the system to make room for new file/s, etc.

Figure 2:
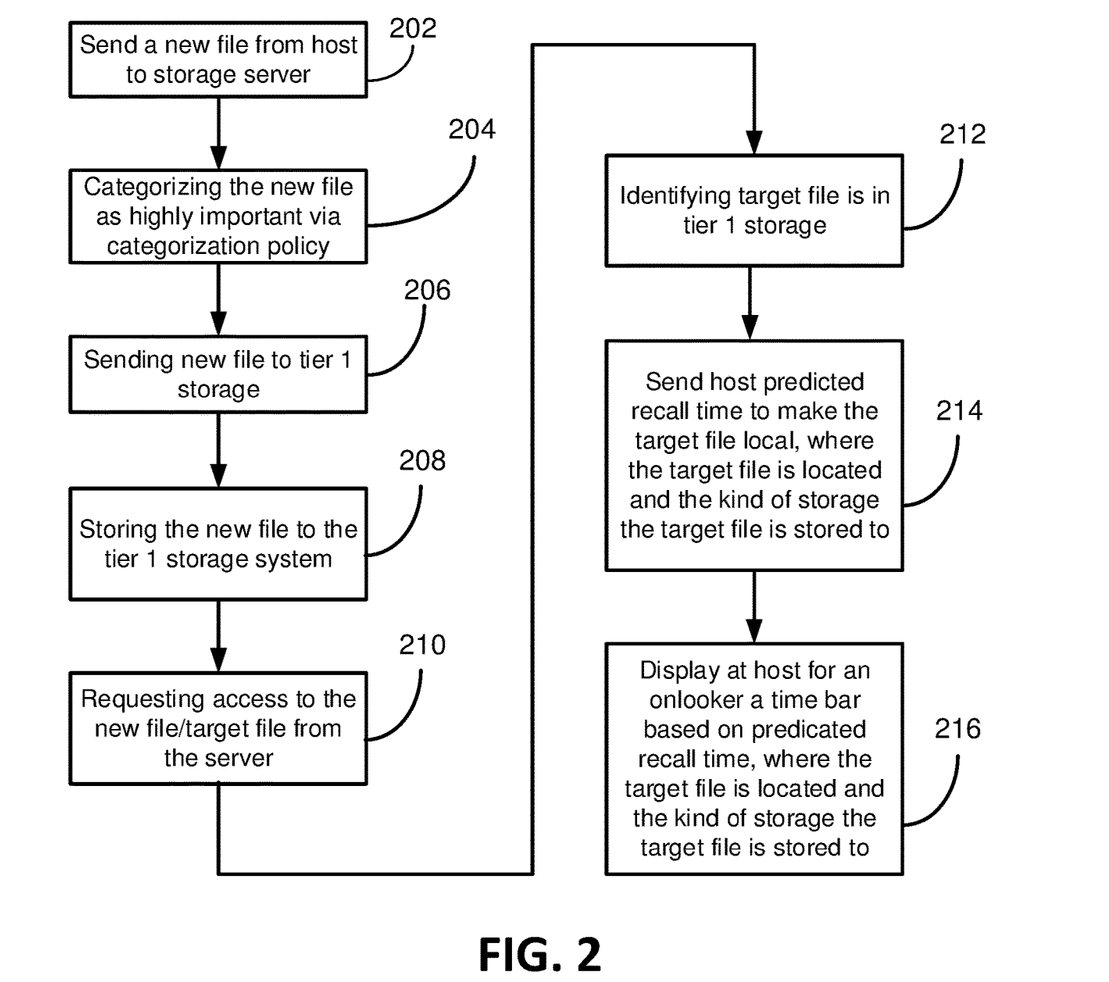
FIG. 2 depicts a method flow chart embodiment of migrating data in a tiered storage arrangement consistent with embodiments of the present invention.

FIG. 2 in view of FIG. 1 depicts a method flow chart embodiment of migrating data in a tiered storage arrangement consistent with embodiments of the present invention. Considering the storage arrangement embodiment of FIG. 1, the tiered storage arrangement 101 includes a host computer system 102 in communication with the server having an operating system 100 that in turn is in communication with a tier 1 storage system 110, a tier 2 storage system, and a tier 3 storage system 119. Clearly, there could be other tiered storage systems attached to the server with the operating system 100, or a plurality of servers represented by the oval block 100.

Method block 202 starts the flowchart by sending a new file for storage from the host computer system 102 to a server 100. The new file is categorized by way of a categorization policy, which determines how important the new file is and to where that new file is going to be sent for storage. In the present embodiment, the categorization policy deems the new file as highly important because it is a "new" file and categorizes the new file as a tier 1 file to be stored in one or more tier 1 storage systems 110, step 204. However, depending on the categorization policy, the new file could be directed to the tier 2 storage system 108 or the tier 3 storage system 119. Step 206 provides for sending the new file to the tier 1 storage system 110. Assuming, the new file is stored to the tier 1 storage system 110 (step 208) and the host computer system 102 wants to recall the new file, which will now be called the target file, the host computer 102 requests access to recall the target file from the server 100, step 210. In certain embodiments, the host computer 102 does not have knowledge of where the target file resides, rather the host computer 102 only knows that the server 100 is handling the target file. In the embodiment that the host computer 102 has no knowledge of where the target file resides, the server identifies which tier the target file is residing, in this case it is in the tier 1 storage 110 (step 212), such as by a directory to which the server has access (e.g., local to the server) or by querying the different storage systems until the target file is found. Once identified, as shown in step 214, the server 100 can ascertain the estimated time to retrieve/recall the target file, send to the host computer 102 where the target file is stored (i.e., tier 1 storage 110), and the kind of storage media the target file is stored to (e.g., flash memory, enterprise HDD, etc.). Optional embodiments contemplate the tier 1 storage 110 sending the server 100 or the host computer 102 via the server 100 the estimated time it will take to transfer the target file to the host computer 102, that the target file is stored on tier 1 storage 110, and the kind of storage media the target file is stored to at the tier 1 storage 100 (e.g., flash memory, enterprise HDD, etc.). The predicted time to make the target file local to the host computer 102, the location where the target file is being extracted from, and the kind of storage medium/media the target file is retained on can be displayed on a display monitor (not shown) at the host computer 102, step 216. Continuing with step 216, the display monitor at the host computer 102 can, in certain embodiments, provide an onlooker (person) a prediction of time, whether a countdown, a clock, or a time bar that grows from left to right as the target file is being recalled and loaded locally, for example, as well as that the target file is located in the tier 1 storage 110 and the kind of storage on which it is retained.

Figure 3:
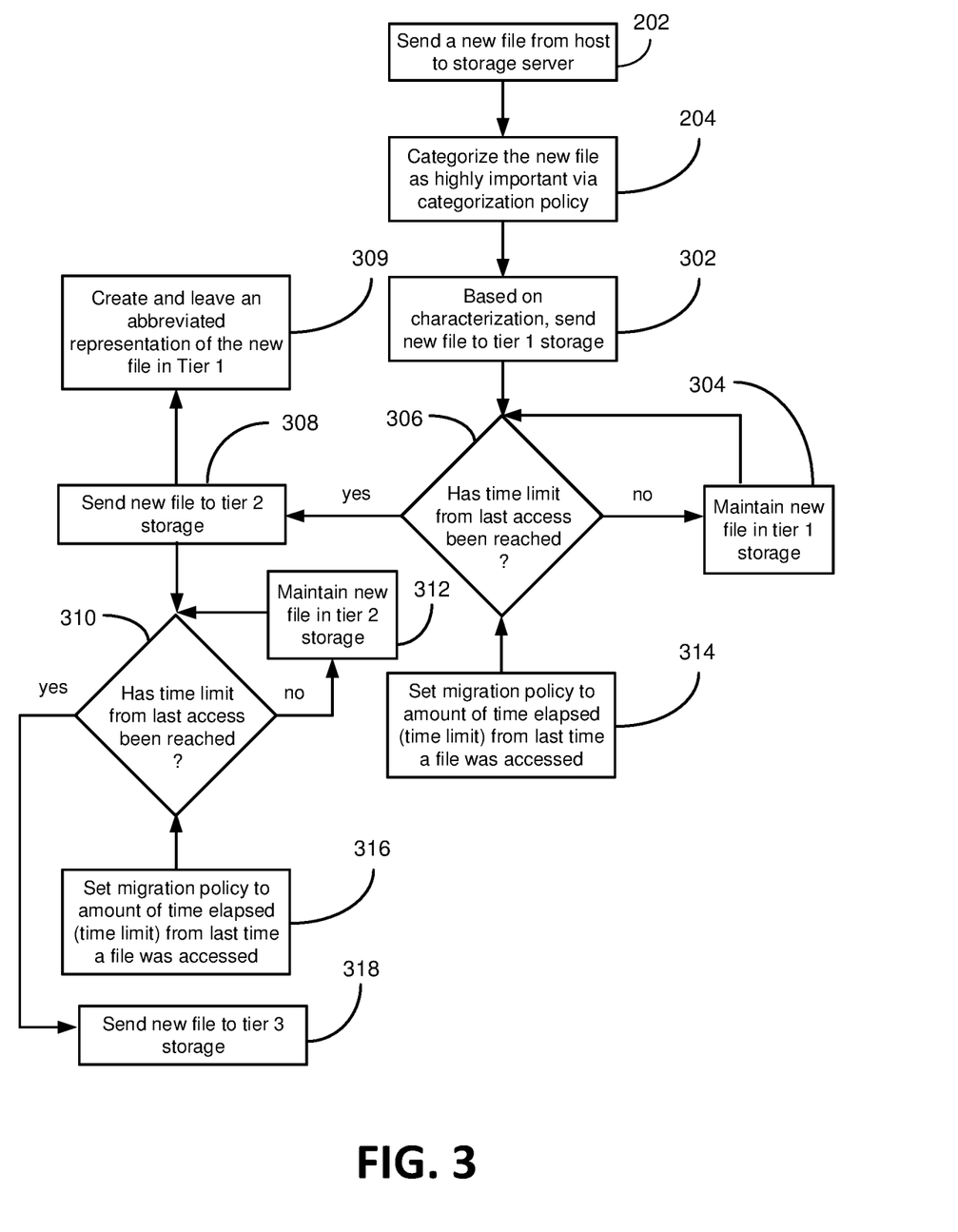
FIG. 3 is a flow chart showing steps for migrating data from a tier 1 storage system 110 to a tier 2 storage system based on a migration policy consistent with embodiments of the present invention.

FIG. 3 is a flow chart showing steps for migrating data from a tier 1 storage system 110 to a tier 2 storage system based on a migration policy consistent with embodiments of the present invention. Leaving off from steps 202 and 204 from FIG. 2, a new file that is received from the host computer 102 is categorized as "highly important", or some other designation establishing that the new file belongs in tier 1 storage 110. Based on the characterization, the new file is sent to the tier 1 storage 110, which as discussed earlier is envisioned, in certain embodiments, to be a high speed storage media, such as Solid State Drives (SSDs), enterprise HDDs, etc., step 302.

Step 306 is a decision step that receives input from step 314 that sets a migration policy to the amount of time elapsed (e.g., a time limit) from the last time the file was access. The migration policy can be a number of different parameters that trigger the migration of a file from the tier 1 storage 110 to another storage, such as tier 2 storage 108. Certain embodiments envision the migration policy being set/established by a host or end user. Examples of other migration policies can include, for example, owner of the file, size of the file, type of file, predicted use of the file, relationship to other files, etc. Optionally, an end user or host can establish what constitutes a file to be stored to tier 1 storage 110. In the present example of decision 306, the migration policy is set as a time limit from when the file was last accessed. For illustrative purposes, let us assume that the migration policy is set for a time limit of 90 days from last being accessed. Accordingly, if the time limit of 90 days has not been reached, maintain the file in tier 1, step 304. If the time limit, however, has reached 90 days then proceed to step 308, which is to send the file to tier 2 storage 108. The tier 2 storage 108, in certain embodiments, is envisioned to be slower and less expensive than the tier 1 storage 110. Examples of tier 2 storage 108 can be standard disk drives, optical disks, SMR HDDs, etc. Also, as shown in step 309, when the new file is migrated to another tier, create and leave an abbreviated representation (snippet of data), such as a thumbnail picture, first GB of data, a bit of the first part of the file, the middle of the file and the end of the file, etc., for example. In this way, the host computer system 102 can quickly receive an idea of what the file is, or optionally the abbreviated snippet of data can start migrating from the tier 1 storage 110 to the host computer 102 while the rest of the file can continue to migrate from the tier 2 storage 108, thus the speeding up the recalling process.

With continued reference to FIG. 3, step 310 is a decision block that receives input from step 316 to set a migration policy for the tier 2 storage system 108. In this case, the migration policy is the amount of time elapsed from the last time the file was accessed, which for purposes of illustration is set to be 270 days. Continuing with step 310, if the time limit of 270 days has not been reached from the last time the file was accessed then maintain the file in tier 2 storage 312. However, if the time limit has reached 270 days, send the file to tier 3 storage 119, step 318.

Figure 4:
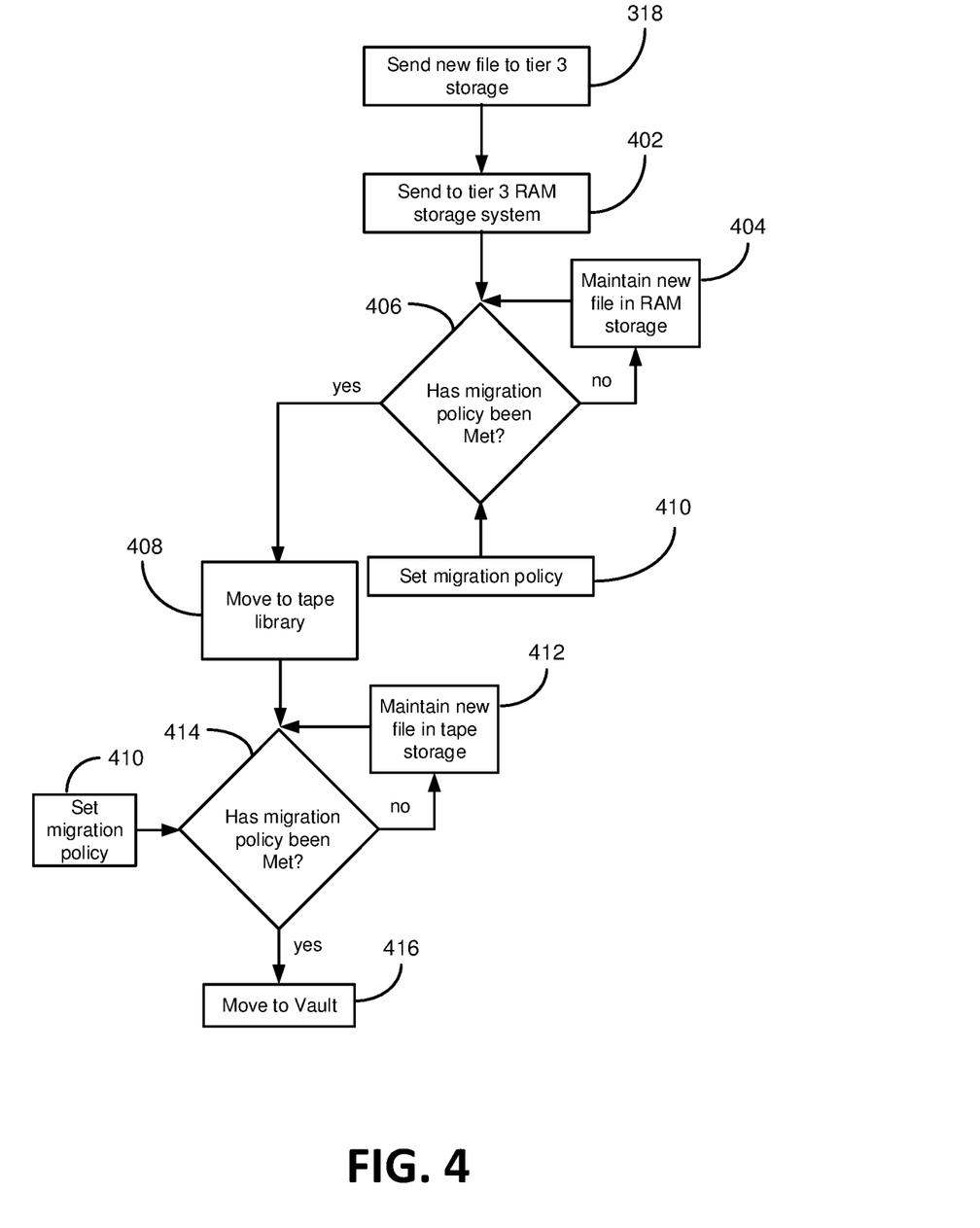
FIG. 4 is a flow chart showing steps for migrating data to a tier 3 storage system 119 and the related "deep storage" systems based on migration policies consistent with embodiments of the present invention.

FIG. 4 is a flow chart showing steps for migrating data to a tier 3 storage system 119 and the related "deep storage" systems based on migration policies consistent with embodiments of the present invention. Continuing from step 318 whereby the file is sent to tier 3 storage 119, in the present embodiment in view of FIG. 1, tier 3 storage 119 includes a) a tier 3 RAM storage system 104, which can be commercially practiced with a Black Pearl cache and server system manufactured by Spectra Logic Corporation of Boulder, Colo., b) a tape library 106, which can be commercially practiced with a T-950 tape library manufactured by Spectra Logic Corporation, and c) a vault 112, which can be an off-site room holding tape cartridges organized by an index.

One skilled in the art will appreciate that "deep storage" does not have to be the components depicted in FIG. 1, but can be other kinds of libraries and storage systems and potentially off-site storage locations. Much like the embodiment of FIG. 3, a migration policy can be set for the tier 3 RAM storage system 119, input step 410. For purposes of illustration, assume the migration policy in the decision step 406 is 90 days. If the time limit from last point of access, e.g., 90 days, has not been met, maintain the file in the RAM storage system 104, step 404. If the time limit from the last time of access has been met, e.g., 90 days, migrate the file to the tape library 106, step 408. Again, input a migration policy (step 410) for the tape library 106 to the decision block 414. For purposes of illustration set the migration policy 410 to two years from the time the file was last accessed. If the time limit from the last point of access has not been met, e.g., two years, maintain the file in the tape library 106, step 412. If the time limit from the last part of access, e.g., two years, has been met, migrate the file to the vault 112, step 416. The vault 112 can be an off-site room near the tape library 106 or, optionally, miles away from the tape library 106. In certain instances seeking a tape cartridge from the vault 112 requires a human to physically move the tape cartridge from the vault 112 to the tape library 106.

Figure 5:
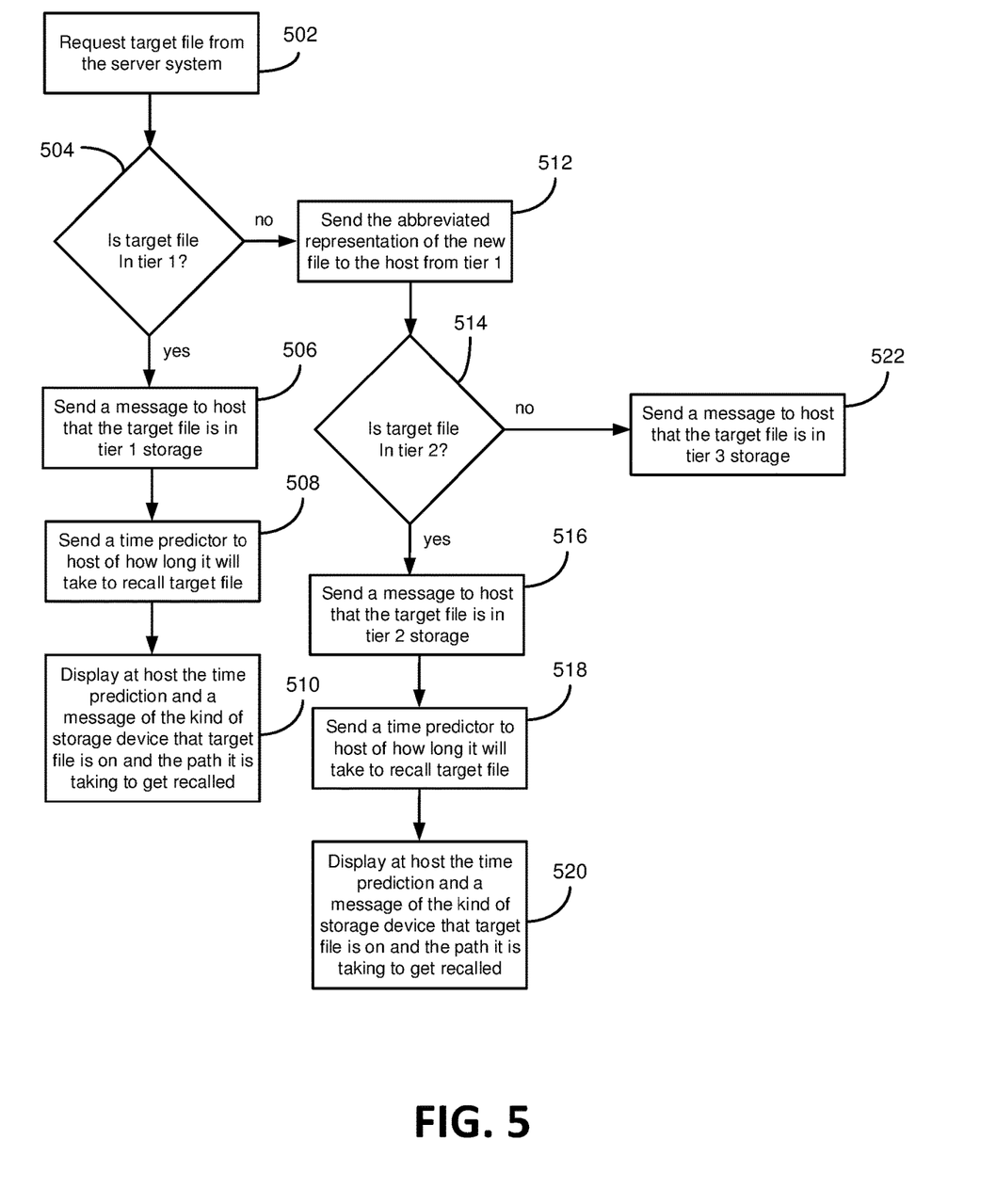
FIG. 5 is a flow chart broadly presenting steps to recall a target file in a tiered storage system consistent with embodiments of the present invention.
Figure 6A:
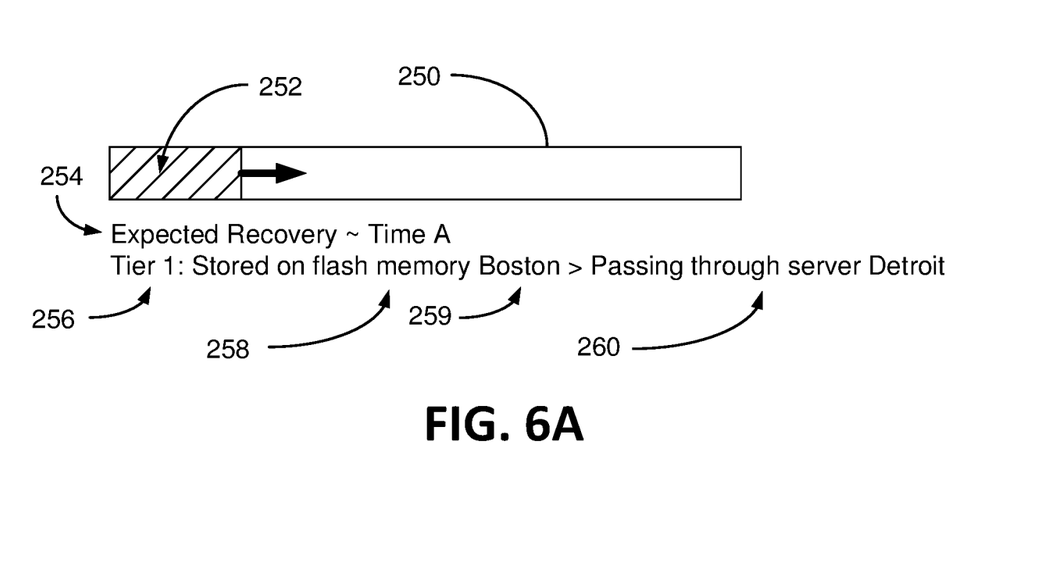
FIG. 6A illustratively depicts a time bar and messaging drawing embodiment that provides an animated prediction of time to recall and to make local the target file consistent with embodiments of the present invention.

FIG. 5 in view of FIG. 6A is a flow chart broadly presenting steps to recall a target file in a tiered storage system consistent with embodiments of the present invention. With reference to the "new file" stored to the tiered storage system 101, described in FIGS. 3 and 4, step 502 is a request to recall the "new file", now in this example referred to as the "target file", from the server system 100. Certain embodiments contemplate the request being made by the host computer system 102 whereby the host computer system 102 relies on the server system 100 to maintain the target file. Certain embodiments further contemplate the host computer system 102 having no knowledge of where the target file is prior to recalling the target file other than that the target file is managed by the server system 100. Step 504 is a decision step that in certain embodiments is performed by the server system 100 to locate the target file. The step asks if the target file is in tier 1 storage 110. If yes, then proceed to step 506, which is to send a message to the host computer system 102 that the target file is in tier 1 storage 110. Certain embodiments contemplate a map, or directory, of all files stored in the tiered storage system 101 that is accessible by the server system 100. Yet another embodiment contemplates a map, or directory, of all file locations retained in the server system 100. Step 508 is to further send a message to the host computer system 102 of the approximate time it will take to recall the target file and make local to the host computer system 102. As depicted in FIG. 2B and in step 510, at least the prediction of time and a message of the kind of storage device that the target file is residing on are displayed on a display device/monitor at the host computer system 102. Other embodiments contemplate additional messaging of the path over which the target file will be taking, or is taking, when being recalled, which can also be displayed on the display device.

As depicted in FIG. 6A, the display device at the host computer system 102 can display, for example, a time bar 250 that provides an animated prediction of time to recall and to make local the target file consistent with embodiments of the present invention. The time bar 250 depicts the hashed region 252 growing from the left to the right, as depicted by the arrow. Furthermore, the display device can provide additional information such as expected recovery time 254, that the target file is coming from tier 1 storage 256, that the tier 1 storage is a flash memory 258 and that the target file is residing in Boston 259. Moreover, information displayed on the display device can include that the target file is passing through a server that is located in Detroit 260. This information equips the onlooker with information that provides confidence as to where the target file is, the kind of storage the target file is residing on, and the path or route the target file will take to arrive locally to support the expected recovery time. This information provides, among other things, anxiety relief to a user of data because with this information the user of data understands what is occurring during the recovery of the file (e.g., knowledge to the user of data that everything is working properly and nothing is broken. In other words, the user of data does not have to patiently wait a long time to recover data to ultimately get a "time-out" response because of some problem somewhere along the way.), as opposed to a spinning circle or time bar that doesn't actually give the end-user/onlooker any information other than that the file is being loaded. Hence, in the instance where the target file is in "the cloud" and end-user has no idea where that target file really is, more precise data on the whereabouts of the target file, path to recovery, and time to recovery is welcome information.

With reference to the decision step 504, if it is discovered that the target file is not in tier 1 storage 110, then proceed to step 512. In this embodiment, because the other tiered storage system/s are likely slower in recalling information than the tier 1 storage 110, the abbreviated representation of the target file is sent to the host computer system 102. Meanwhile, the decision step 514 is an inquiry step questioning if the target file is in tier 2 storage 108. If target file is in tier 2 storage, then proceed to step 516, which is to send a message to the host computer 102 that the target file is in tier 2 storage 108. Otherwise, proceed to step 523, which is look for the target file in tier 3 storage. Step 518 is to further send a message to the host computer system 102 of the approximate time it will take to recall the target file and make local to the host computer system 102.

Figure 6B:
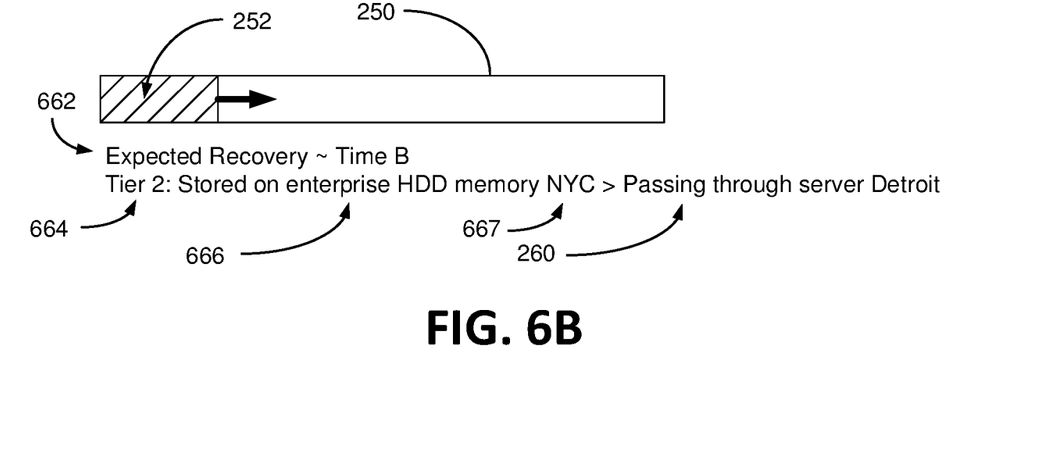
FIG. 6B illustratively depicts a time bar that provides an animated prediction of time to recall and to make local the target file consistent with embodiments of the present invention.

As depicted in FIG. 6B and block 520, the display device at the host computer system 102 can display, for example, a time bar 250 that provides an animated prediction of time to recall and to make local the target file consistent with embodiments of the present invention. The time bar 250 depicts the hashed region 252 that grows from the left to the right, as depicted by the arrow. Furthermore, the display device can provide additional information such as expected recovery time B 662, that the target file is coming from tier 2 storage 664, that the tier 2 storage is enterprise HDD memory 666 and that it is residing in New York City 667. Moreover, information displayed on the display device can include that the target file is passing through a server that is located in Detroit 260.

Figure 7:
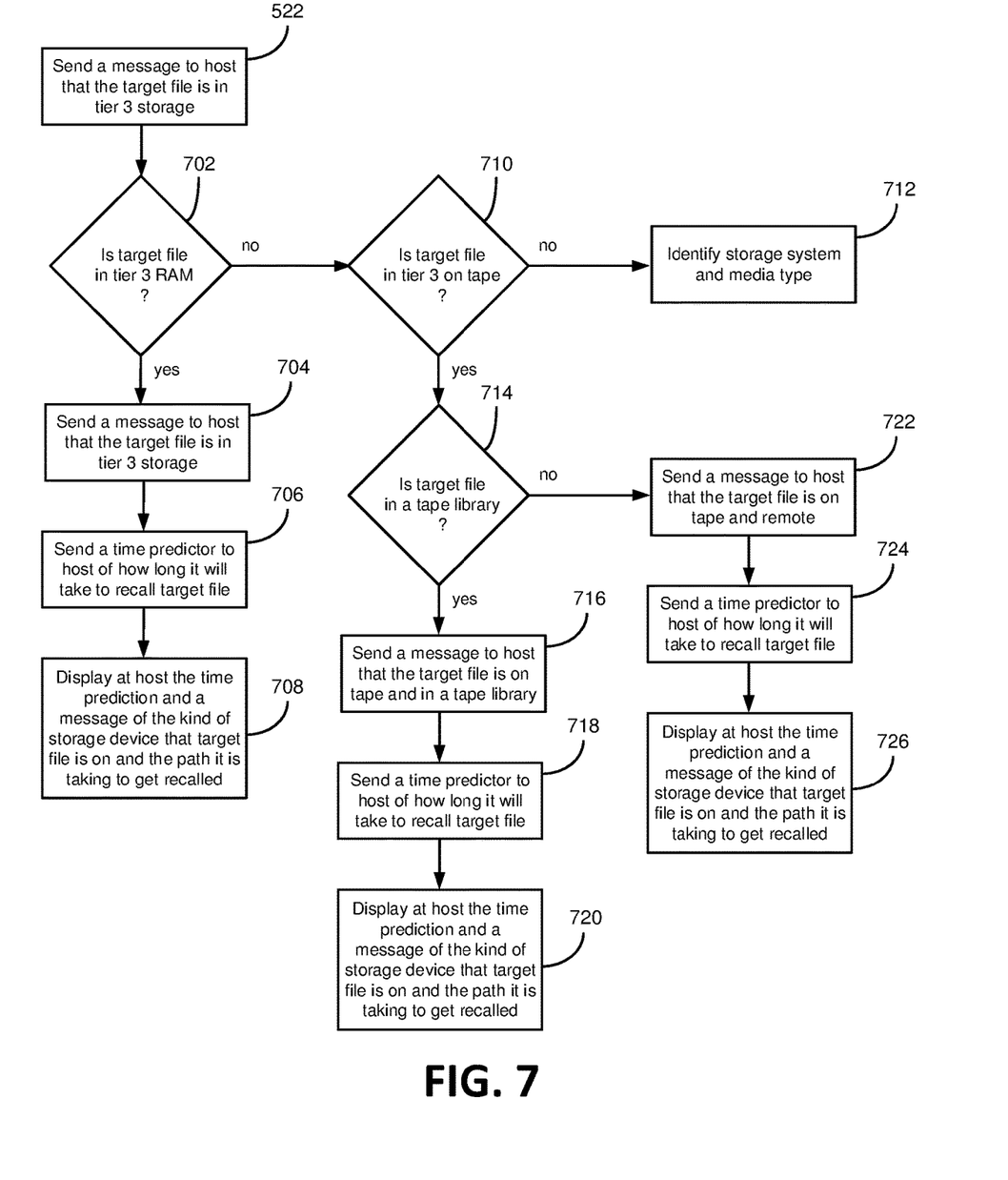
FIG. 7 is a flow chart presenting steps to recall a target file from deep storage consistent with embodiments of the present invention.

With reference back to the decision step 514 and FIG. 7, if it is discovered that the target file is not in tier 2 storage 108, then proceed to step 522, wherein the target file is in tier 3 storage 119. Tier 3 storage 119 is considered "deep storage" where data is retained primarily for archive purposes just in case it is needed again. Though, in this embodiment, the tier 3 storage configuration 119 comprises a RAM server/cache system 104, tape library capability 106, and off-site storage/vault 112, other embodiments contemplate a variety of archive storage systems including optical disk, different kind of tape, HDDs, etc. Decision 702 asks the question is the target file in tier 3 RAM? If yes, then proceed to step 704, which is to send a message to the host computer system 102 that the target file is in tier 3 storage. Step 706 is to send the time predictor to the host storage system 102 of how long it will take to recall the target file and make local to the host computer system 102. At least the time predictor and a message of the kind of storage device in which the target file resides displayed on a display device/monitor at the host computer system 102.

Figure 6C:
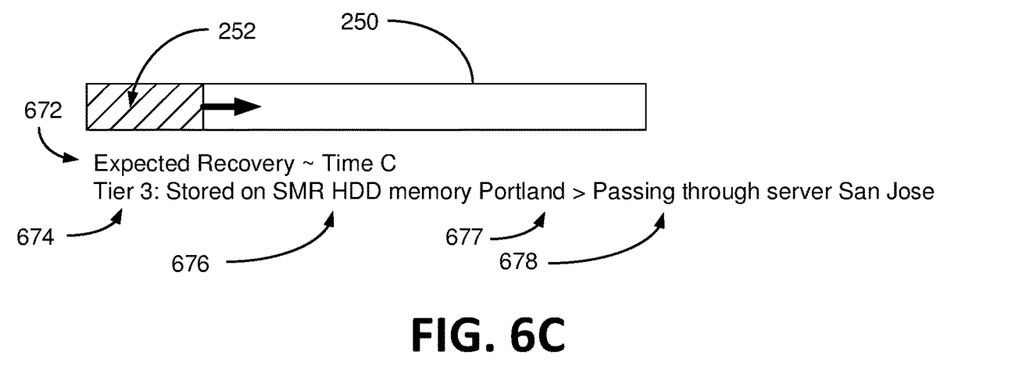
FIG. 6C illustratively depicts a time bar that provides an animated prediction of time to recall and to make local the target file consistent with embodiments of the present invention.

One embodiment of step 708 is depicted by the schematic in FIG. 6C consistent with embodiments of the present invention. As depicted, the display device at the host computer system 102 can display, for example, a time bar 250 provides an animated prediction of time to recall and to make local the target file. The time bar 250 depicts the hashed region 252 that grows from left to right, as indicated by the right facing arrow. Furthermore, the display device can provide additional information such as expected recovery time C 672, that the target file is coming from tier 3 storage 674, that the tier 3 storage is SMR HDD memory 676 and that the target file is residing in Portland, Oreg. 677. Moreover, information displayed on the display device can include that the target file is passing through a server that is located in San Jose 678. Certain embodiments contemplate a message indicating periodic updated information, such as every 2 seconds, where the target file is and where the target file is passing through. Other embodiments contemplate a time bar associated with each message displayed on the display device, such as, how much of the file is in the San Jose server while it makes its way to the host computer system 102.

With continued reference to FIG. 7, back to step 702, if the target file is not in tier 3 RAM memory 104 then proceed to step 710, which asks if the target file is on tier 3 tape. If no, then identify the storage system and media type on which the target file resides, step 712. If yes, proceed to decision step 714, which asks if the target file is in a tape library 106. If the target file is in a tape library 106, then proceed to step 716, which is to send a message to the host computer system 102 that the target file is on a tape cartridge in a tape library 106. Step 718 is a step for sending a time predictor to the host storage system 102 of how long it will take to recall the target file and make local to the host computer system 102. A display device at the host computer system 102 is envisioned to display the time prediction and a message that the target file is on a tape cartridge in a tape library. Additional embodiments contemplate a message displayed on the display device the path over which the target file will proceed on its way to being loaded to the host computer system 102.

Figure 6D:
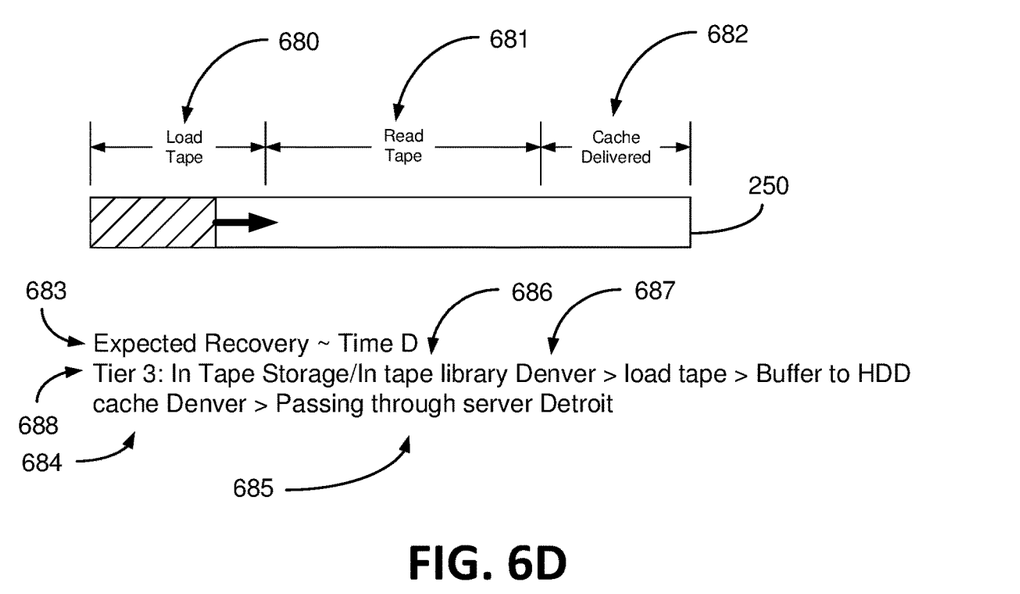
FIG. 6D illustratively depicts a time bar that provides an animated prediction of time to recall and to make local the target file consistent with embodiments of the present invention.

One embodiment of step 720 is depicted by the schematic in FIG. 6D consistent with embodiments of the present invention. As depicted, the display device at the host computer system 102 can display, for example, a time bar 250 provides an animated prediction of time to recall and to make local the target file. The time bar 250 depicts the hashed region that grows from left to right, as indicated by the right pointing arrow. Furthermore, the display device can provide additional information, such as expected recovery time D 683, that the target file is coming from tier 3 storage 688, that the target file is on tape media that is located in a tape library 686, and that the target file is residing in Denver 687. Moreover, the path over which the data is recalled can be displayed on the display device, such as load tape 689 buffer to HDD cache in Denver 684, whereby when cached the data will pass through the Detroit 685. Because of the complex nature of recalling data from a tape cartridge, the present embodiment includes status information over the time bar, such as the predicted time it will take to load the tape cartridge 680, the predicted time to read and buffer the target data from the tape cartridge 681, and make local the data 682. In this way, an onlooker will be provided the adequate information to understand essentially where the target data is during the process of recalling and making local the target data. Other embodiments contemplate a time bar for each segment of recovery (loading the tape cartridge, reading the tape cartridge, buffering the tape cartridge, etc.). Yet other embodiments contemplate providing a single time bar, but multiple time predictions for each of the segments of recovery.

Figure 6E:
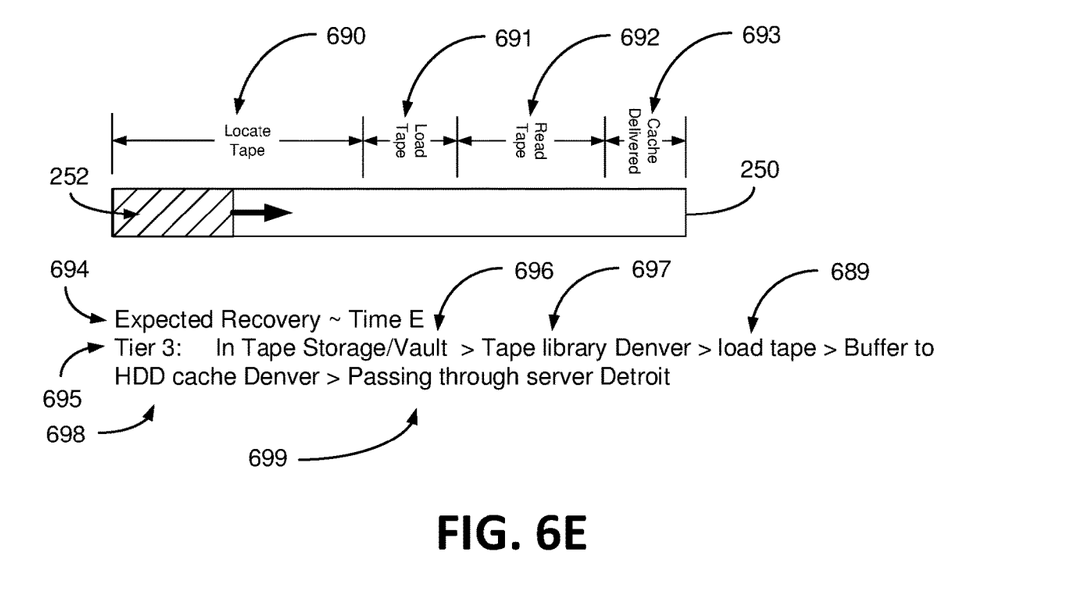
FIG. 6E illustratively depicts a time bar that provides including messages and a map of where the target data is during the recall process consistent with embodiments of the present invention.

Back to step 714, if the target file is not in a tape library, then send a message to the host computer system 102 that the target file is on a tape cartridge, but that the tape cartridge is in a remote location, i.e., a vault 112, step 722. Send a time predictor to the host computer system 102 of how long it will take to recall the target file, step 724. Step 726 in view of FIG. 6E is to display to the host computer of the time prediction and a message of the kind of storage device of the target file is on, and optionally in addition to the path the target file will be taking to get recalled. FIG. 6E depicts a time bar 250 displayed on the display device locally at the host computer system 102 including messages and a map of where the target data is during the recall process. For example, the time bar 250 shows a hashed region 252 growing from the left to the right, as depicted by the right pointing arrow. Above the time bar 250 is the map of where the target data is during the recall process, i.e., the amount of time to locate the tape cartridge 690, the amount of time to load the tape cartridge 691, the amount of time to read the target data from tape cartridge 692 and the amount of time to deliver the target data to the host computer system 102. Below the time bar 250 is additional information of the pathway to recover the target data. For example, the expected recovery time E 694, that the target file is coming from tier 3 storage 695, that the target file is on tape media that is located off-site from a tape library in a storage vault 696, that the tape cartridge will be moved from the vault 112 to a tape library in Denver 697, that the tape cartridge will be loaded in a tape drive in the tape library 689, that the target data will be read from the tape cartridge and buffered in an HDD cache in Denver 698, and that the target data will pass through a server in Detroit 699 on its way to the host computer system 102.

Figure 6F:
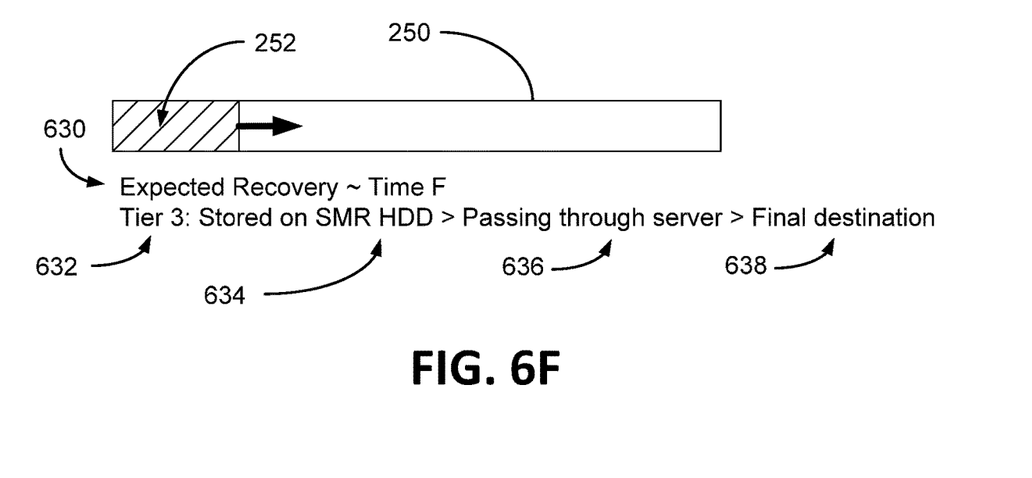
FIG. 6F illustratively depicts another embodiment of a time bar/progress bar consistent with embodiments of the present invention.

FIG. 6F depicts another embodiment of a time bar/progress bar consistent with embodiments of the present invention. As shown, immediately below the time bar 250 is a message indicating the expected recovery time F 630. Immediately below that is a map of detailed information such as the data is being retrieved by a tier 3 storage system 632, which is stored to an SMR HDD 634, which is passing through a server system 636 on its way to the present or final destination 638. The information 630-638 can be immediately above, to the left or right of the time bar 250. The information 630-638 can be displayed one step at a time next to or even in the time bar 250 indicating where the data is and its progress. In this embodiment, the data 252 is not displayed as coming from a specific location (such as a city). Certain embodiments envision other ways of communicating the device and/or location and/or progress of recalling data in conjunction with the time bar.

Figure 8:
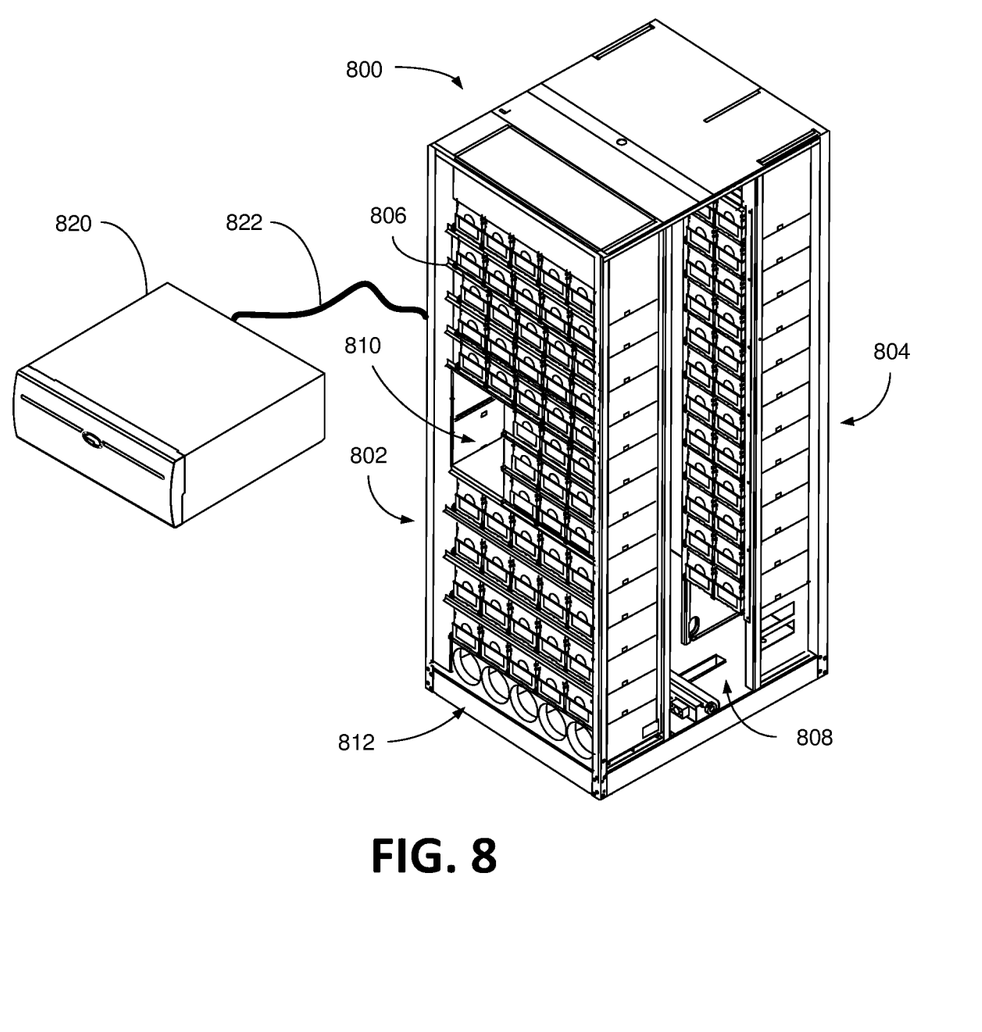
FIG. 8 shows a drawing of a commercial embodiment in which certain embodiments of the present invention can be practiced.

Embodiments of the present invention in tier 3 storage can be commercially practiced in a Black Pearl archive storage system that possesses a Spectra Logic T-Finity tape cartridge library on the backend manufactured by Spectra Logic of Boulder Colo. FIG. 8 shows a commercial embodiment of one Black Pearl archive storage system 820 communicatively linked with the T-Finity unit 800 via a cable 822. The T-Finity unit 800 is shown without an enclosure, whereby the T-Finity unit 800 is a single cabinet whereby multiple cabinets can be combined to make an expandable library. The Black Pearl archive storage system 820 possesses archive storage controller (not shown) and a plurality of hard disk drives (not shown) and software that facilitates receiving data from a server (not shown), caching that data in at least one of the plurality of hard disk drives, running LTFS software, providing a device driver (such as a SCSI to format data streams to tape format), encoder/decoder software, compression software, and the like in addition to control storing data to tape cartridges in the T-Finity library 800. The Black Pearl archive storage system 820 can complete the methods described herein including sending tape formatted data to the tape library 800 where a tape drive (not shown) and tape cartridge (not shown) can store (or retrieve) the received formatted data as described herein. The Black Pearl archive storage system 820 is capable of handling all tape related storage commands without the server's involvement. The T-Finity unit 800 comprises a first and second shelf system 802 and 804 that are adapted to support a plurality of the mobile media, such as tape cartridge magazines 806 comprising a plurality of LTO-6 tape cartridges, archived in the library 800. The second shelf system 804 comprises at least one tape drive (not shown) adapted to read and write data to and from a tape cartridge. Functionally interposed between the first and second shelf system 802 and 804 is a magazine transport space 1408. The magazine transport space 808 is adapted to provide adequate space for a tape cartridge magazine 806 to be moved, via a magazine transport (not shown) and cartridge picker device (not shown), from a position in the first shelf system 802, for example, to/near a drive. Tape cartridge magazines 806 can be transferred into and out from the T-Finity library via an entry/exit port 810. Transferring tape cartridge magazines 806 in and out of the T-Finity library can be accomplished by an operator, for example. The T-Finity library comprises a means for cooling as shown by the fans 812, located at the base of the unit 800.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the display device can arrange recall information in a number of different ways to communicate where target data is at any given time with an accurate prediction while still maintaining substantially the same functionality without departing from the scope and spirit of the present invention. Another example can include using a more complex tiered storage arrangement beyond the tier 1-tier 2-tier 3 system embodiment or a less complex storage arrangement while still maintaining substantially the same functionality without departing from the scope and spirit of the present invention. Further, though a time bar is primarily used to provide a visual to an onlooker of the progression of recalling a target file, or files, other visual or informational displays can be equally used such as a clock or a digital timer, etc., without departing from the scope and spirit of the present invention. Certain embodiments envision a variety of different ways to communicate the path or the progress of recalling data in a manner not laid out in the examples above. For example, information related to the type of storage or more generically the level of tiered storage over which data is coming from is presented to the user of data via an interface display in real time or near the real time the data is being recalled. Certain embodiments envision the information blinking or on the time bar or near the time bar. Further, the terms "one" is synonymous with "a", which may be a first of a plurality.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A storage arrangement comprising:
    a server linked to a tier 1 storage system and a tier 2 storage system, the tier 1 storage system comprises high-speed Random Access Media (RAM) storage devices, the tier 2 storage system comprises RAM storage devices that are slower than the high-speed RAM storage devices;
    a first target file retained in the tier 1 storage system and a second target file retained in the tier 2 storage system;
    a host computer system that has access to the first target file and the second target file via the server, the host computer system devoid of knowledge of where the first target file and the second target file are retained prior to recalling either the first target file or the second target file;
    a display device that displays both that the second target file is retained in the tier 2 storage system and a prediction of how long the second target file will take to recover at the host computer system when recalled by the host computer system.

2. The storage arrangement of claim 1 further comprising in addition to displaying that the second target file is retained in the tier 2 storage system, said display device further displays what kind of storage system the tier 2 storage system is.

3. The storage arrangement of claim 1 wherein said display further includes in what kind of memory said second target file is retained and what geographical location said second target file is located in.

4. The storage arrangement of claim 1 wherein said display further includes a status of what geographical location/s said second target file is located in during migration from said tier 2 storage system when recalled.

5. The storage arrangement of claim 1 further comprising a tier 3 storage system which includes a tape library comprising a third target file that is retained on at least one tape cartridge, said display further including a status of at least a portion of steps involved in loading and reading the at least one tape cartridge.

6. The storage arrangement of claim 1 wherein a tier 3 storage system includes a tape library and a third target file that is retained on at least one tape cartridge, said display further including a status of at least one of locating said tape cartridge, loading said tape cartridge in a tape drive, and reading a tape cartridge when in a tape drive.

7. The storage arrangement of claim 1 wherein said display further includes a message indicating that said second target file is passing through a second server before reaching its final destination.

8. A storage arrangement comprising:
    a server linked to a tier 3 storage system that comprises a plurality of tape cartridges, a tape library with on-site storage of at least some of the tape cartridges, a vault with off-site storage capability for storing at least some of the tape cartridges;
    a first target file retained in the tier 3 storage system;
    a host computer system that has access to the first target file via the server, the host computer system devoid of knowledge that the first target file is retained in the tier 3 storage system prior to a request to recall the first target file; and
    a display device at the host computer system arranged and configured to display after said request that the first target file is retained in the tier 3 storage system, that the first target file is either on-site or off-site, approximate time to recover the first target file when recalled by the host computer system, and where the first target file is located during first target file recall.

9. The storage arrangement of claim 8 further comprising a tier 1 storage system and a tier 2 storage system, the tier 1 storage system possessing random storage media that perform storage operations faster than the tier 2 storage system, the first target file first retained at the tier 1 storage system before being migrated to the tier 2 storage system before being migrated to the tier 3 storage system, and an abbreviated representation of the first target file retained in the tier 1 storage system.

10. The storage arrangement of claim 8 wherein a directory of where the first target file is located resides with the server.

11. A method comprising:
    providing a host computer connected to a server, the server linked to a tier 1 storage system and a tier 2 storage system, the tier 1 storage system possessing high-speed Random Access Media (RAM) storage devices, the tier 2 storage system comprises RAM storage devices that are slower than the high-speed RAM storage devices;
    requesting access to a second data file, the request originating by the host computer and targeted to the server;
    the server locating the second data file in the tier 2 storage system, the host computer having no knowledge that the second data file is located in the tier 2 storage system;
    transmitting a message to the host computer that the second data file is in the tier 2 storage system;
    sending a prediction time it will take to recall the second data file to the host computer;
    displaying the prediction time on a display monitor linked to the host computer displaying that the second data file is located at the tier 2 storage system; and
    displaying at least a portion of a storage device path and how much time the second data file will take to reach the host computer from the tier 2 storage system.

12. The method of claim 11, wherein the prediction time is displayed as a time bar, the location that the second data file is coming from tier 2 storage is displayed immediately next to the time bar, and the portion of the path is displayed with the time bar.

13. The method of claim 11, wherein the portion of the path is a map displayed with the time bar.

14. A method comprising:
    providing a host computer connected to a server, a display connected to the host computer, the server linked to a tier 1 storage system and a tier 2 storage system, the tier 1 storage system possessing high-speed Random Access Media (RAM) storage devices, the tier 2 storage system possessing archive storage that has slower data transfer performance than the high-speed RAM storage devices;

requesting access to a first data file, the request originating at the host computer and targeting the server;

the server locating the first data file in the tier 2 storage system;

transmitting a message to the host computer that the first data file is in the tier 2 storage system;

transferring said first data file from the tier 2 storage system to the host computer; and during said transferring step, displaying at least one type of storage device is included in the tier 2 storage system alongside a predicted time to complete said transferring step and at least transferring progress of the first data file from the tier 2 storage system to the host computer, the transferring progress includes displaying that said transmission is from the tier 2 storage system and/or the type of storage device from which said first data file originated.

15. The method of claim 14 further comprising displaying what geographical location in which said tier 2 storage system resides.

16. The method of claim 15 further comprising displaying, in real time, a map of geographical locations that said first data file is passing through during said transferring step.

17. The method of claim 16 further comprising displaying, in real time, how much of said first data file is in each of said geographical locations during said transferring step.

18. The method of claim 14 wherein said predicted time is graphically displayed from a beginning of said transferring step to a conclusion of said transferring step.

19. The method of claim 14 further comprising said server sending said predicted time to said host computer.

20. The method of claim 14 wherein said tier 2 storage system is a tape library comprising tape cartridges and said first data file is on at least one tape cartridge.

21. The method of claim 20 further comprising displaying tape data recall progress of at least two described steps as time-based steps during the process of reading said at least one tape cartridge, said tape data recall progress is in real time.

22. The method of claim 21 wherein said at least two described steps are selected from a group comprising, locating said at least one tape cartridge, moving said at least one tape cartridge to a corresponding tape drive, loading said at least one tape cartridge in a corresponding tape drive, reading said at least one tape cartridge from said tape drive, and transferring data from said tape drive elsewhere.

23. The method of claim 20 wherein said at least one tape cartridge is in a vault that is off-site from said tape library, and further displaying on said display device that said first data file is on said at least one tape cartridge located off-site in said vault and a relocation time prediction to relocate said at least one tape cartridge from said vault to said tape library.

24. The method of claim 23 further displaying in real time progress of said at least one tape cartridge being relocated.

* * * * *